W. A. VAN BRUNT.

Seeding Machine.

No. 3,846. Reissued Feb. 15, 1870.

Witnesses:
A. W. Hart.
C. A. Pettit.

Inventor:
W. A. Van Brunt.

N. PETERS, Photo-Lithographer, Washington, D. C.

UNITED STATES PATENT OFFICE.

W. A. VAN BRUNT, OF HORICON, WISCONSIN.

IMPROVEMENT IN SEEDING-MACHINES.

Specification forming part of Letters Patent No. 94,258, dated August 31, 1869; Reissue No. 3,846, dated February 15, 1870.

*To all whom it may concern:*

Be it known that I, WILLARD A. VAN BRUNT, of Horicon, in the county of Dodge and State of Wisconsin, have invented a new and Improved Seeding-Machine; and I do hereby declare that the following is a full, clear, and exact description of the same, reference being had to the accompanying drawings, forming part of this specification, in which—

Figure 1:
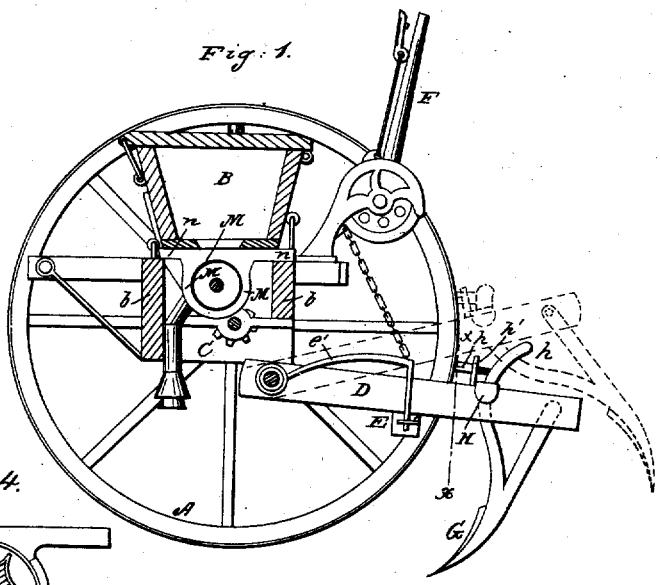
Figure 4:
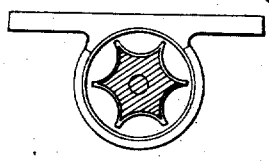
Figure 2:
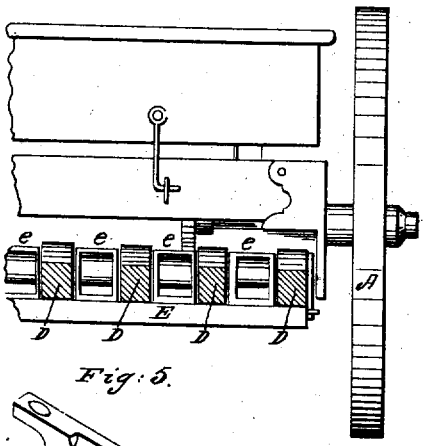
Figure 3:
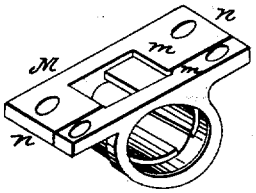
Figure 6:
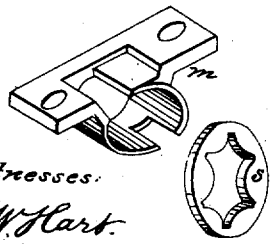
Figure 5:
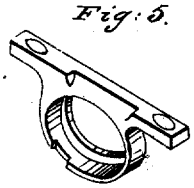

Figure 1 is a longitudinal vertical section. Fig. 2 is a cross-section through line *x x* of Fig. 1. Fig. 3 is a detached view of the box M inclosing the feed-cylinder. Figs. 4, 5, and 6 represent details of the box M.

The object of this invention is to improve the construction of seeding-machines by the application of new devices for adjusting the teeth and their drag-bars, and a novel construction of the boxes inclosing the feed-cylinders, as hereinafter described.

In the drawings, A A are the draft-wheels; B, the seed-box resting on a frame composed of two cross-pieces, *b b*, united at their ends by a metallic plate, C, and supporting between them the feed-cylinders, their shaft, and inclosing-boxes; D D, the drag-bars; E, a bar extending under the drag-bars, and connected by a cord or chain to a lever by which to raise or lower them all at once; and G G, the cultivator-teeth, attached to the drag-bars. The teeth are constructed with a bifurcated shank, the rear part of which is articulated to the end of the drag-bar, the front part being curved and extending through a vertical slot in the drag-bar, as shown in Fig. 1.

Upon the upper end of the curved arm of the shank slips a plate, H, provided with a flange or lug, *h*, and set-screw *h'*, by which it can be fixed at any point on the curved shank, so that when the machine is at work the nut will draw down against the upper edge of the drag-bar and from a stop to hold the tooth in position; but when the latter comes in contact with any obstacle the nut will slip and yield and let the tooth turn back on its pivot and pass over the obstacle. The nut H may be struck up at a blow from an iron plate, and, together with its screw, will not appreciably increase the cost of the machine.

The bar E is intended not only to raise and lower the drag-bars, but to keep them parallel with each other. To this end a bent iron rod, *e*, in the form of an inverted U, is affixed to the bar between each adjacent pair of drag-bars, as shown in Fig. 2, the drag-bars at the sides of the machine being held in place by a bent rod, *e'*, of the form seen in Fig. 1, one end of which is pivoted at the side of the drag-bar and the other attached to the end of the bar E. It should be observed that each drag-bar is independently articulated, allowing it to be raised alone, the bar E lifting them all at once. The same result may obviously be reached by omitting altogether the wooden bar E and employing in its place an iron rod properly bent up between the drag-bars and at the sides of the machine.

It is evident that the above result could not be obtained if the bar E connected, or if it was placed over, the drag-bars, sustaining and keeping them parallel by means of loops passing around them.

The bent rod *e'* being pivoted, instead of rigidly attached to the outside drag-bar, allows such bar to be raised without disturbing the rod, and thereby moving the bar E.

The boxes M M, inclosing the feed-cylinders, are constructed in two pieces, *m m'*, fitting together at their edges, and inclosing between them the disk *s*, which forms the end of the seed-pockets, the whole being supported by the two frame-pieces *b b* by means of flanges *n n*, cast as part of the boxes and resting upon the upper edge of the frame-pieces. Each of the parts *m m'* is cast in one piece, through which extends the cylinder-shaft, and in which works the cylinder. An opening is provided in the under side of the box for the escape of the seed. The form and construction of these boxes are well shown in Figs. 3,4, 5, and 6.

Having thus described my invention, what I claim as new, and desire to secure by Letters Patent, is—

1. The arrangement, in combination, of the lifting-bar E and bent pieces *e*, as and for the purpose specified.

2. The bent rods *e'*, constructed and arranged as set forth, in combination with the bar E, bent pieces *e*, as described, and for the purpose specified.

3. The plate H, with lug *h* and set-screw *h'*, when used in combination with drag-bar and tooth, as described.

4. The boxes M M, when constructed of the two parts *m m'*, inclosing between them the disk, as described, each of said parts *m m'* being cast in a single piece, substantially as set forth.

W. A. VAN BRUNT.

Witnesses:
J. F. RANDOLPH,
H. BARBER.